(12) United States Patent
Lin

(10) Patent No.: US 11,314,341 B2
(45) Date of Patent: Apr. 26, 2022

(54) MOUSE DEVICE

(71) Applicant: Chicony Electronics Co., Ltd., New Taipei (TW)

(72) Inventor: I-Fu Lin, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/209,779

(22) Filed: Mar. 23, 2021

(65) Prior Publication Data

US 2021/0342019 A1 Nov. 4, 2021

(30) Foreign Application Priority Data

Apr. 29, 2020 (TW) .................................. 109114425

(51) Int. Cl.
*G06F 3/0354* (2013.01)

(52) U.S. Cl.
CPC ................ *G06F 3/03543* (2013.01)

(58) Field of Classification Search
CPC .................................................. G06F 3/03543
See application file for complete search history.

(56) References Cited

U.S. PATENT DOCUMENTS

| | | | | |
|---|---|---|---|---|
| 4,249,794 A * | 2/1981 | Haley | ............... | G02B 6/352 250/227.22 |
| 5,268,674 A * | 12/1993 | Howard | .............. | G06F 3/03543 200/332 |
| 6,011,543 A * | 1/2000 | Tian | .................... | G06F 3/03543 345/157 |
| 6,243,078 B1 * | 6/2001 | Rosenberg | ............. | G06F 3/011 345/161 |
| 6,697,043 B1 * | 2/2004 | Shahoian | .............. | A63F 13/285 345/156 |
| 11,042,224 B1 * | 6/2021 | Stoeckli | .................. | G06F 3/023 |
| 11,150,741 B1 * | 10/2021 | Stoeckli | .................. | G06F 3/023 |
| 2002/0135559 A1 * | 9/2002 | Hou | ..................... | G06F 3/03543 345/156 |
| 2007/0122076 A1 * | 5/2007 | Ishiyama | ................ | G02B 6/42 385/19 |
| 2008/0284735 A1 * | 11/2008 | Shim | ..................... | G06F 3/0317 345/166 |
| 2018/0196531 A1 * | 7/2018 | Tsai | ...................... | G06F 3/0383 |

* cited by examiner

*Primary Examiner* — Ariel A Balaoing
(74) *Attorney, Agent, or Firm* — Muncy, Geissler, Olds & Lowe, P.C.

(57) ABSTRACT

A mouse device includes a casing, a button, a connecting rod assembly, an elastic member, and an optical switch. A pressing block of the button extends into the casing. The connecting rod assembly is disposed in the casing and is rotatably disposed on a shaft base of the casing. The elastic member is disposed in the casing and elastically abuts against the connecting rod assembly, so that the connecting rod assembly abuts against the pressing block to allow the button at an initial position. The optical switch is disposed in the casing and adjacent to the connecting rod assembly. The button can be moved from the initial position to a pressed position relative to the casing so as to drive the connecting rod assembly to rotate, so that the connecting rod assembly is moved relative to the optical switch to trigger the optical switch.

15 Claims, 9 Drawing Sheets

MOUSE DEVICE

CROSS-REFERENCE TO RELATED APPLICATION

This non-provisional application claims priority under 35 U.S.C. § 119(a) to Patent Application No. 109114425 filed in Taiwan, R.O.C. on Apr. 29, 2020, the entire contents of which are hereby incorporated by reference.

BACKGROUND

Technical Field

The instant disclosure relates to peripherals for computers, in particular, to a mouse device.

Related Art

Mice are common input devices for computers. Regarding the operations of the mouse, the button is a component which is most frequently operated. For example, the user may select certain item(s) or trigger certain action(s) by pressing the button and controlling the cursor of the mouse. Therefore, the operation feeling of the button is important for the user.

SUMMARY

For most of the mice known to the inventor, physical switches (e.g., microswitches) are served as buttons triggers of the mice. When the button of a mouse known to the inventor is pressed, the button abuts against and presses the trigger unit of the physical switch to generate signals for controlling the cursor of the mouse. However, it is understood that, the mice known to the inventor have assembling tolerances and/or size tolerances. As a result, when a mouse known to the inventor is assembled, an excessive spacing may be formed between the button and the physical switch of the assembled mouse. Therefore, idle strokes of the button occur, thereby affecting the operation feeling and sensitivity of the button for the user. Furthermore, every pressing operation of the button will lead the button to wear against the trigger unit of the physical switch, thus shortening the service life of the mouse.

In view of this, in one embodiment, a mouse device is provided. The mouse device comprises a casing, a button, a connecting rod assembly, an elastic member, and an optical switch. A shaft base is disposed in the casing. The button is disposed on the casing. The button has a pressing block, and the pressing block extends into the casing. The connecting rod assembly is disposed in the casing and is rotatably disposed on the shaft base. The elastic member is disposed in the casing. The elastic member elastically abuts against the connecting rod assembly, so that the connecting rod assembly abuts against the pressing block of the button to allow the button to be at an initial position. The optical switch is disposed in the casing and adjacent to the connecting rod assembly. The button is capable of being moved from the initial position to a pressed position relative to the casing so as to drive the connecting rod assembly to rotate, so that the connecting rod assembly is moved relative to the optical switch to trigger the optical switch.

As above, according to the mouse device of one or some embodiments of the instant disclosure, when the button of the mouse device is pressed, the button instantly drives the connecting rod assembly to rotate and to trigger the optical switch, thus preventing the idle stroke issues and allowing the button to provide a proper operation feeling and sensitivity during operation. Moreover, during the operation of the mouse device, the optical switch is not worn, thus greatly increasing the service life of the mouse device.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
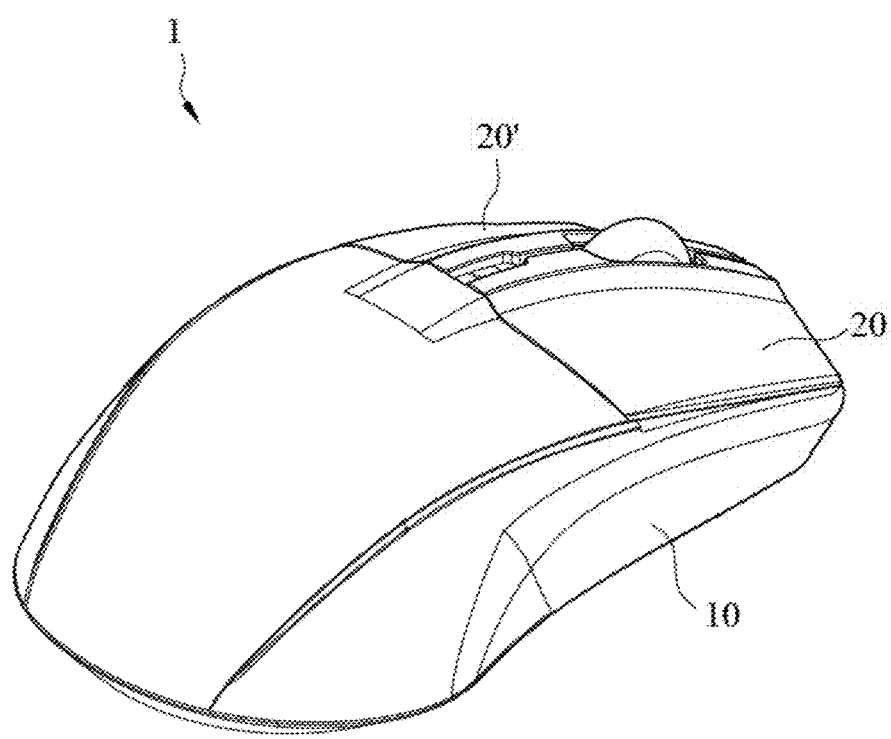
FIG. 1 illustrates a perspective view of a mouse device according to a first embodiment of the instant disclosure.
Figure 2:
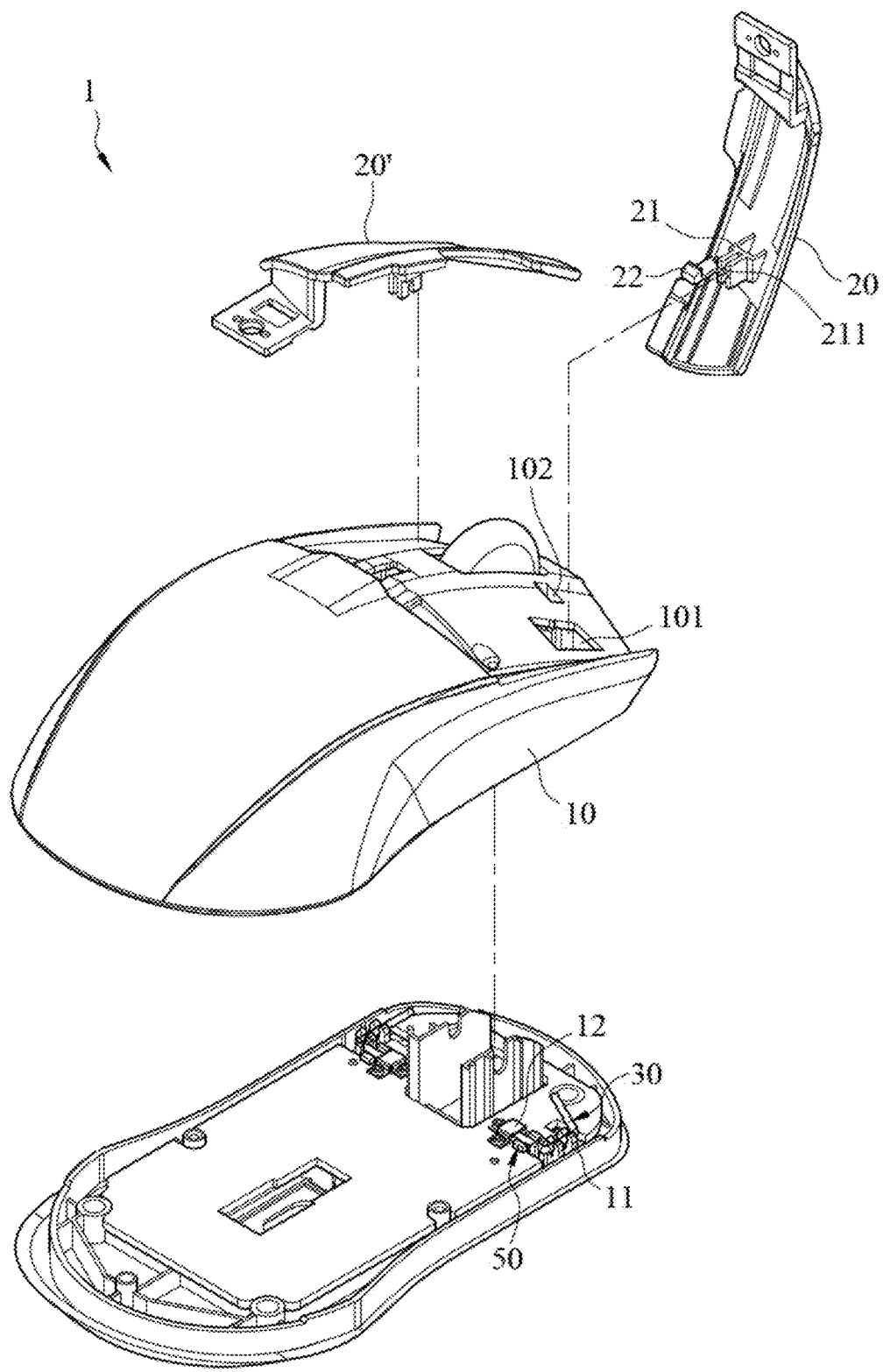
FIG. 2 illustrates an exploded view of the mouse device of the first embodiment.

FIG. 1 illustrates a perspective view of a mouse device 1 according to a first embodiment of the instant disclosure. FIG. 2 illustrates an exploded view of the mouse device 1 of the first embodiment. As shown in FIGS. 1 and 2, the mouse device 1 is an input device for a computer, and the mouse device 1 is provided for controlling the mouse curser of the computer (e.g., a personal computer, a notebook computer, or a tablet computer) to move, to select item(s), or to perform other actions.

In some embodiments, specifically, the mouse device 1 may be a mechanical mouse, an optical mouse, or a laser mouse. With regard to the transmission method, the mouse device 1 may be a wired mouse. For example, the mouse device 1 may be connected to the port (e.g., a USB port) of the computer through a cable, so that the mouse device 1 can transmit data to the computer through the cable. Alternatively, the mouse device 1 may be a wireless mouse, and the mouse device can wirelessly transmit data to the computer through emitting infrared radiofrequency signals or Bluetooth signals.

Figure 3:
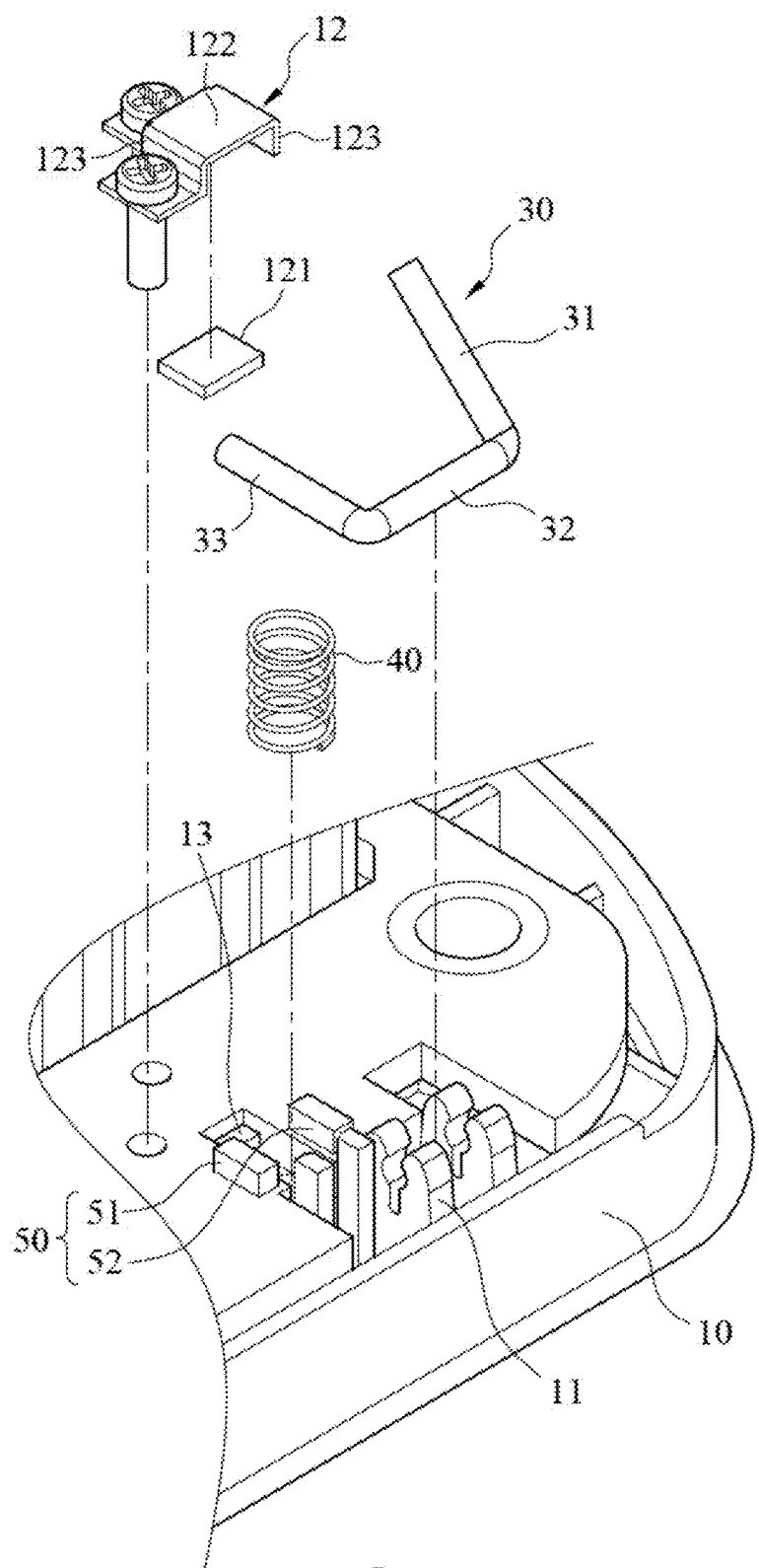
FIG. 3 illustrates an enlarged partial exploded view of the mouse device of the first embodiment.

FIG. 3 illustrates an enlarged partial exploded view of the mouse device 1 of the first embodiment. As shown in FIGS. 1, 2, and 3, the mouse device 1 comprises a casing 10, at least one button 20, a connecting rod assembly 30, an elastic member 40, and an optical switch 50. In this embodiment, the mouse device 1 is a two-button mouse and comprises two buttons 20, 20' (namely, the right button and the left button), and the two buttons 20, 20' are pressibly disposed on the casing 10, respectively. The connecting rod assembly 30, the elastic member 40, and the optical switch 50 are disposed in the casing 10 and correspond to one of the buttons 20 (in this embodiment, the right button). When the button 20 is pressed, the button 20 drives the connecting rod assembly 30 to trigger the optical switch 50 so as to generate a corresponding signal for controlling the mouse cursor to performs action(s). Detailed descriptions are provided in the following paragraphs.

In some embodiments, another trigger mechanism having components same as or similar to the connecting rod assembly 30, the elastic member 40, and the optical switch 50 as described above may be disposed in the casing 10 of the mouse device 1 and corresponds to the other button 20' (as shown in FIG. 2, the left button), such that the button 20' can be pressed to trigger the switch to generate a corresponding signal in a similar manner. It is understood that, the trigger mechanism corresponding to the button 20 is described in the following paragraphs.

Figure 13:
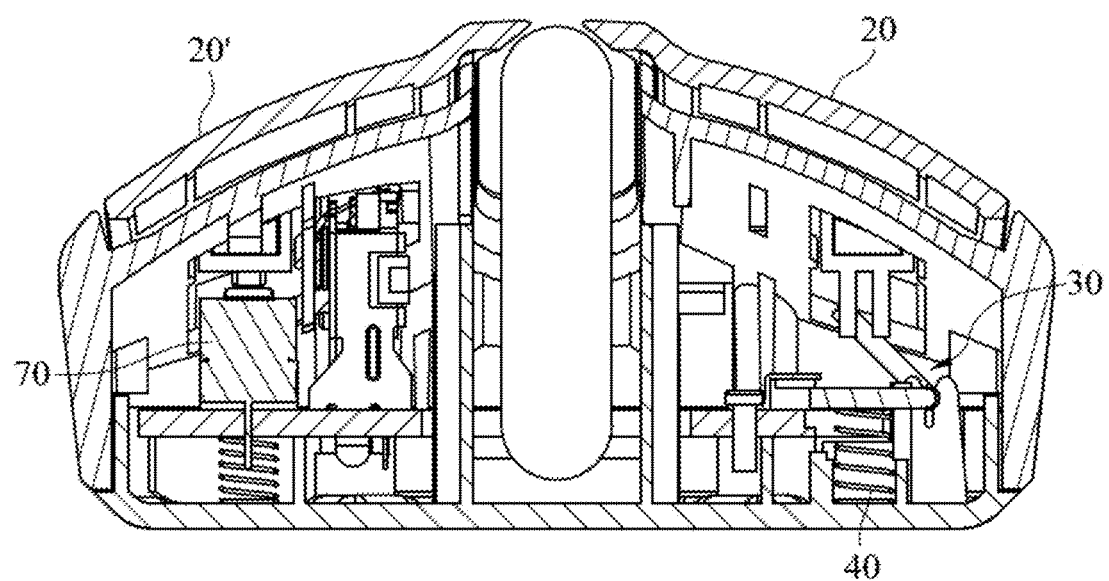
FIG. 13 illustrates a cross-sectional view of a mouse device according to a fourth embodiment of the instant disclosure.

Alternatively, as shown in FIG. 13, in another embodiment, a switch member 70 in other types (e.g., a microswitch) may be disposed in the casing 10 to correspond to the button 20'. Accordingly, in this embodiment, the button 20' can be pressed to trigger the switch to generate a corresponding signal in a different manner, but embodiments are not limited thereto.

As shown in FIGS. 2 and 3, the button 20 has a pressing block 21, and the pressing block 21 extends into the casing 10. Therefore, when the button 20 is pressed, the button 20 abuts against and presses the connecting rod assembly 30 in the casing 10 through the pressing block 21. In this embodiment, the button 20 is an elongated plate member, one of two ends of the button 20 is fixed on the casing 10, and the other end of the button 20 is not fixed on the casing 10. Accordingly, when the other end of the button 20 is pressed, the other end of the button 20 is moved downwardly relative to the casing 10 in a swinging manner. Moreover, in this embodiment, the casing 10 has a through hole 101, the pressing block 21 extends from the inner surface of the button 20, passes through the through hole 101, and inserts into the casing 10.

Figure 4:
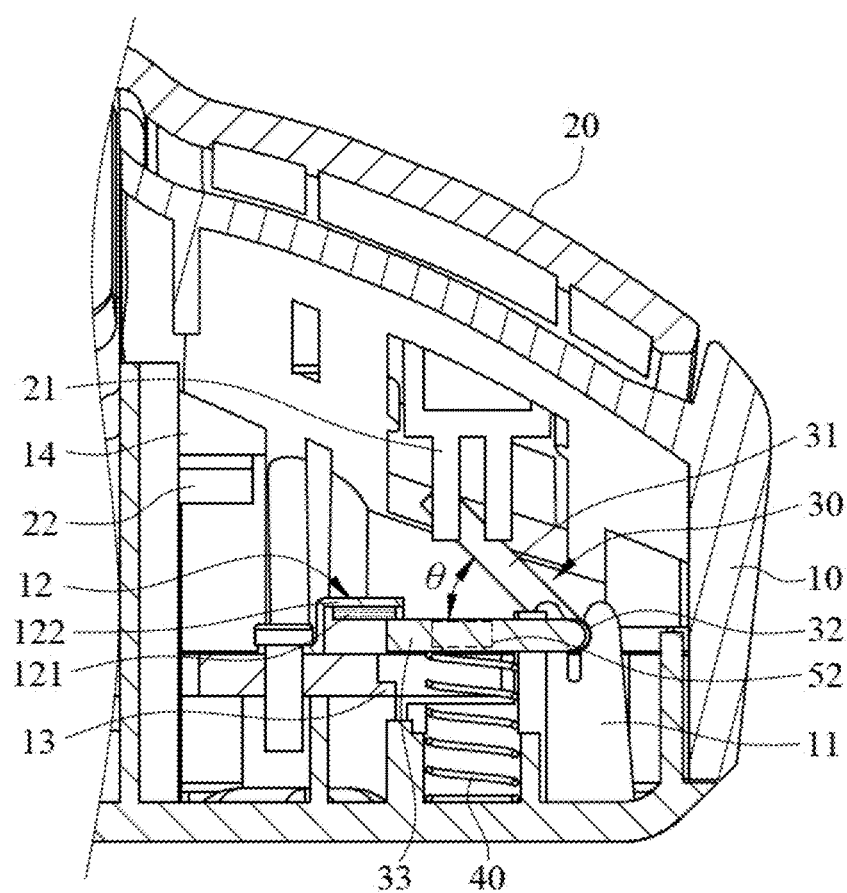
FIG. 4 illustrates a cross-sectional view showing that the button of the mouse device is at an initial position.

FIG. 4 illustrates a cross-sectional view showing that the button 20 of the mouse device 1 is at an initial position. As shown in FIGS. 2 to 4, the connecting rod assembly 30 is disposed in the casing 10 and comprises a first connecting rod 31, a rotation shaft 32, and a second connecting rod 33. In this embodiment, a shaft base 11 is disposed in the casing 10, and the rotation shaft 32 of the connecting rod assembly 30 is rotatably disposed on the shaft base 11. The first connecting rod 31 and the second connecting rod 33 respectively extend from the rotation shaft 32. When the rotation shaft 32 rotates relative to the shaft base 11, the first connecting rod 31 and the second connecting rod 33 move along with the rotation of the rotation shaft 32. In other words, in this embodiment, when the rotation shaft 32 rotates relative to the shaft base 11, the first connecting rod 31 and the second connecting rod 33 swing by taking the rotation shaft 32 as the swinging center.

As shown in FIGS. 3 and 4, in this embodiment, the first connecting rod 31, the rotation shaft 32, and the second connecting rod 33 of the connecting rod assembly 30 are integrally formed as a one-piece structure. The first connecting rod 31 and the second connecting rod 33 integrally extend and bend from two opposite ends of the rotation shaft 32, respectively. Moreover, a predetermined angle $\theta$ is between the first connecting rod 31 and the second connecting rod 33 (for example, the predetermined angle $\theta$ may be 20 degrees, 30 degrees, or 45 degrees, depending on the requirements for the products). Regarding the embodiment shown in FIG. 3, the shaft base 11 is disposed at a bottom portion inside the casing 10 and is spaced from a bottom portion of the pressing block 21 of the button 20. The second connecting rod 33 and the rotation shaft 32 are at the same plane, and the first connecting rod 31 extends toward the bottom portion of the pressing block 21 of the button 20, such that the first connecting rod 31 and the second connecting rod 33 are not aligned in parallel to have the predetermined angle $\theta$.

It is understood that, the aforementioned embodiment(s) of the connecting rod assembly 30 is provided as illustrative examples, and the connecting rod assembly 30 may have other configurations. For instance, please refer to FIG. 14, which illustrates a partial perspective view of a mouse device 1 according to another embodiment of the instant disclosure. In this embodiment, the first connecting rod 31C and the second connecting rod 33 extend and bend from the two opposite ends of the rotation shaft 32, respectively, and the first connecting rod 31C and the second connecting rod 33 are aligned in parallel and at the same plane, such that the first connecting rod 31C, the second connecting rod 33, and the rotation shaft 32 form a U-shape connecting rod structure. In other words, in this embodiment, the angle between the first connecting rod 31C and the second connecting rod 33 is 0 degrees.

In some embodiments, the first connecting rod 31, the rotation shaft 32, and the second connecting rod 33 of the connecting rod assembly 30 may be separated components for being assembled and positioned with each other to form an assembled structure.

Furthermore, as shown in FIGS. 3 and 4, the elastic member 40 is disposed in the casing 10 and elastically abuts against the second connecting rod 33, so that the first connecting rod 31 abuts against the pressing block 21 of the button 20 to allow the button 20 to be at an initial position (as shown in FIG. 4, the initial position is a position that the button 20 is not pressed). In this embodiment, the elastic member 40 is a spring and fixed in the casing 10. The connecting rod assembly 30 is between the pressing block 21 of the button 20 and the elastic member 40. One end of the elastic member 40 elastically abuts against the second connecting rod 33, so that the elastic member 31 provides an elastic force to allow the first connecting rod 31 to abut against the bottom portion of the pressing block 21. Accordingly, a spacing for pressing operation can be maintained between the button 20 and the casing 10, and the button 20 is at the initial position.

In some embodiments, the elastic member 40 may be other elastic structures. For example, the elastic member 40 may be an elastic piece, an elastic pad, or the like.

Figure 14:
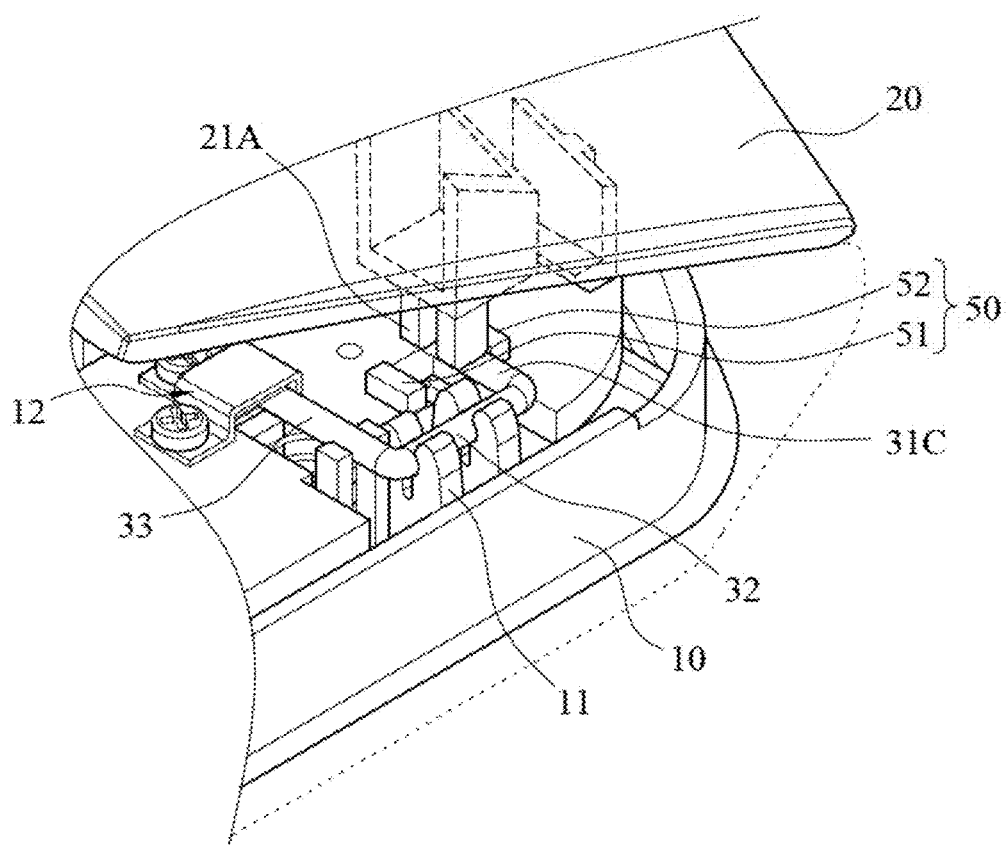
FIG. 14 illustrates a partial perspective view of a mouse device according to a fifth embodiment of the instant disclosure.

In the embodiment shown in FIG. 14, since the first connecting rod 31C is in parallel with the second connecting rod 33, an extended length of the pressing block 21A of the button 20 extending into the casing 10 of the embodiment shown FIG. 14 is greater than an extended length of the pressing block 21 extending into the casing 10 of the embodiment shown in FIG. 4, such that the first connecting rod 31C can properly abut against the pressing block 21A.

As shown in FIG. 3, the optical switch 50 is disposed in the casing 10 and adjacent to the connecting rod assembly 30. In this embodiment, the optical switch 50 is disposed adjacent to the second connecting rod 33 of the connecting rod assembly 30. When the button 20 is pressed, the button 20 drives the connecting rod assembly 30 to allow the second connecting rod 33 to trigger the optical switch 50 to generate corresponding signal(s). Alternatively, the optical switch 50 may be disposed adjacent to the first connecting rod 31C of the connecting rod assembly 30 (as shown in FIG. 14). Accordingly, when the button 20 is pressed, the button 20 drives the connecting rod assembly 30 to allow the first connecting rod 31C to trigger the optical switch 50 to generate corresponding signal(s). Specifically, the configuration of the optical switch 50 may be illustrated in the following embodiments, descriptions for the embodiments are provided along with drawings.

Figure 5:
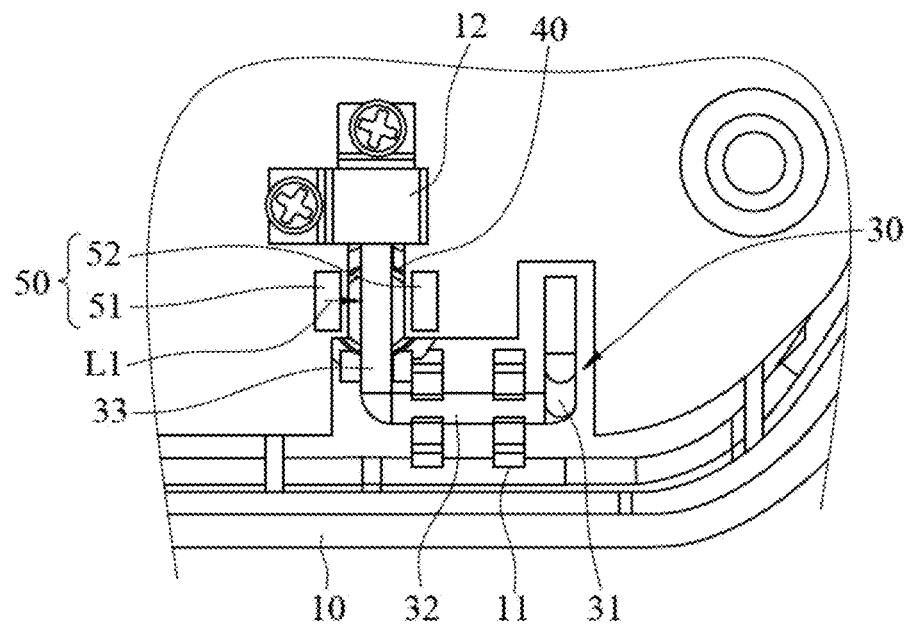
FIG. 5 illustrates a schematic view showing the optical sensing of the button of the mouse device at the initial position, according to an exemplary embodiment of the instant disclosure.

FIG. 5 illustrates a schematic view showing the optical sensing of the button 20 of the mouse device 1 at the initial position, according to an exemplary embodiment of the instant disclosure. As shown in FIGS. 3 to 5, in this embodiment, the optical switch 50 comprises an optical emitter 51 and an optical receiver 52. The optical emitter 51 and the optical receiver 52 are respectively disposed at two opposite sides of the second connecting rod 33 of the connecting rod assembly 30. Specifically, in some embodiments, the optical emitter 51 may be an infrared emitter, a laser emitter, or other visible light emitters to emit a light L1.

Further, as shown in FIGS. 4 and 5, when the button 20 is at the initial position (as shown in FIG. 4, the initial position is a position that the button 20 is not pressed), the second connecting rod 33 is between the optical emitter 51 and the optical receiver 52. Therefore, the light L1 emitted by the optical emitter 51 is blocked by the second connecting rod 33 and does not incident into the optical receiver 52. Accordingly, the optical switch 50 is not triggered due to that the optical receiver 52 does not receive the light L1, such that the signal for controlling the mouse cursor is not generated.

Figure 6:
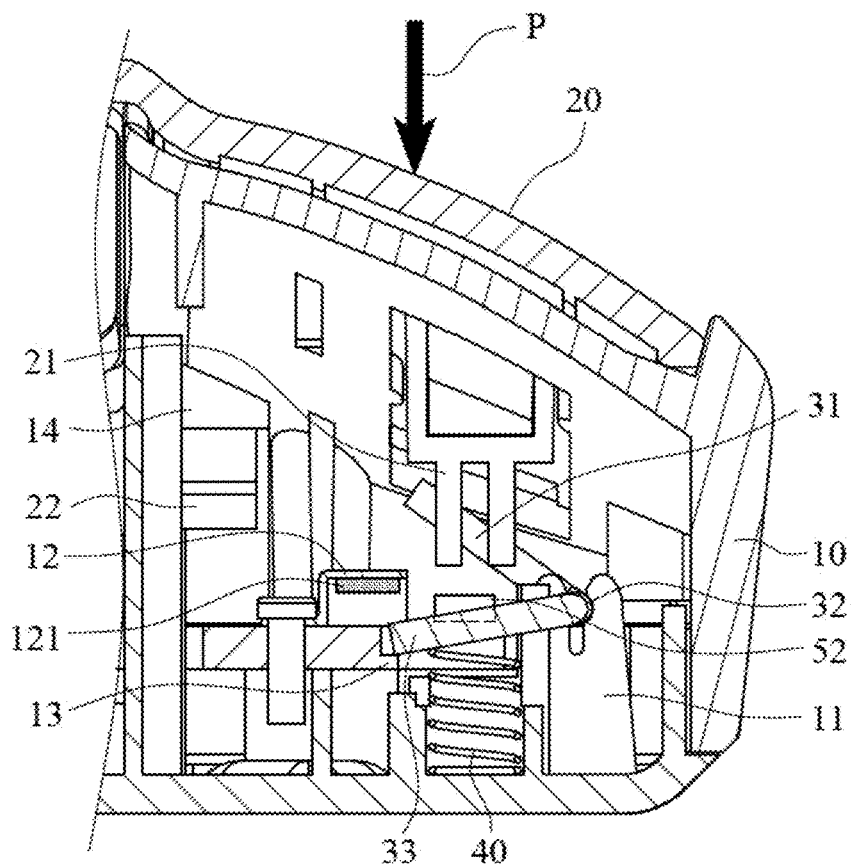
FIG. 6 illustrates a cross-sectional view showing that the button of the mouse device is at a pressed position, according to an exemplary embodiment of the instant disclosure.

As shown in FIG. 6, FIG. 6 illustrates a cross-sectional view showing that the button 20 of the mouse device 1 is at a pressed position, according to an exemplary embodiment of the instant disclosure. When the button 20 is pressed (as indicated by the arrow P), the button 20 is moved relative to the casing 10, from the initial position (as the position indicated in FIG. 4) in a direction toward the connecting rod assembly 30 to a pressed position (as the position indicated in FIG. 6). During the pressing movement of the button 20, since the first connecting rod 31 abuts against the bottom portion of the pressing block 21 of the button 20, and since the first connecting rod 31 and the second connecting rod 33 respectively extend from the rotation shaft 32, the pressing block 21 can press the first connecting rod 31 and drive the first connecting rod 31 to rotate the rotation shaft 32 relative to the shaft base 11 (from the perspective of FIG. 6, the rotation shaft 32 is rotated counterclockwise), such that the second connecting rod 33 swings relative to the optical switch 50 along with the rotation of the rotation shaft 32.

Figure 7:
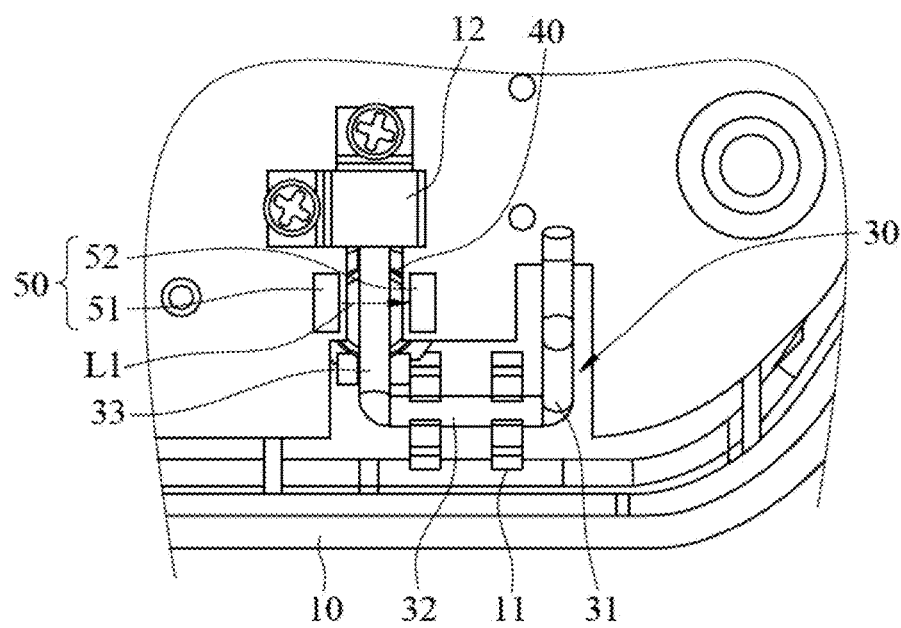
FIG. 7 illustrates a schematic view showing the optical sensing of the button of the mouse device at the pressed position, according to an exemplary embodiment of the instant disclosure.

Further, please refer to FIGS. 6 and 7, where FIG. 7 illustrates a schematic view showing the optical sensing of the button 20 of the mouse device 1 at the pressed position, according to an exemplary embodiment of the instant disclosure. When the button 20 is moved to the pressed position, the second connecting rod 33 abuts against and presses the elastic member 40 to allow the elastic member 40 to store an elastic force. Furthermore, after the second connecting rod 33 is swung, the second connecting rod 33 is not located between the optical emitter 51 and the optical receiver 52. Therefore, the light L1 emitted by the optical emitter 51 is not blocked by the connecting rod assembly 30 and incidents into the optical receiver 52. Accordingly, the optical switch 50 is triggered due to that the optical receiver 52 receives the light L1, such that the signal for controlling the mouse cursor is generated.

In some embodiments, when the button 20 is at the initial position, the second connecting rod 33 may be not located between the optical emitter 51 and the optical receiver 52. Accordingly, the optical switch 50 is not triggered due to that the optical receiver 52 receives the light L1, such that the signal for controlling the mouse cursor is not generated. When the button 20 is at the pressed position, the second connecting rod 33 is located between the optical emitter 51 and the optical receiver 52. Accordingly, the optical switch 50 is triggered due to that the optical receiver 52 does not receive the light L1, such that the signal for controlling the mouse cursor is generated.

As shown in FIGS. 4 and 6, when the button 20 is released and not pressed, the elastic force stored in the elastic member 40 allows the elastic member 40 to abut against the second connecting rod 33 elastically, so that the elastic member 40 drives the second connecting rod 33 to rotate the rotation shaft 32 relative to the shaft base 11 (from the perspective of FIG. 6, the rotation shaft 32 is rotated clockwise). Therefore, the first connecting rod 31 abutting against the bottom portion of the pressing block 21 swings along with the rotation of the rotation shaft 32, thus allowing the button 20 to be moved back to the initial position from the pressed position in a direction away from the connecting rod assembly 30 (as shown in FIG. 4).

In some embodiments, as shown in FIG. 14, in the case that the optical switch 50 is disposed adjacent to the first connecting rod 31C of the connecting rod assembly 30, when the button 20 is at the initial position or the pressed position, the first connecting rod 31C may be configured to be or not to be located between the optical emitter 51 and the optical receiver 52. Therefore, the generation of the signal for controlling the mouse cursor is determined by whether optical receiver 52 receives the light or not.

As above, according to the mouse device 1 of one or some embodiments of the instant disclosure, the connecting rod assembly 30 abuts against the pressing block 21 of the button 20 through the elastic member 40, and the mouse device is triggered by an optical manner. Therefore, when the button 20 is pressed, the button 20 instantly drives the connecting rod assembly 30 to move and to trigger the optical switch 50. Hence, as compared with a mouse device triggered by a physical switch, the mouse device 1 according to one or some embodiments does not have a spacing between the button 20 and the optical switch 50 caused by the assembling tolerance and the size tolerance, thus preventing the idle stroke issues. Therefore, the mouse device 1 according to one or some embodiments of the instant disclosure can provide a proper operation feeling and sensitivity during operation. Moreover, during the operation of the mouse device 1, the optical switch 50 is not worn, thus greatly increasing the service life of the mouse device 1.

In addition to foregoing advantages, the operation feeling and the stroke of the button 20 of the mouse device 1 according to one or some embodiments of the instant disclosure can be adjusted easily. For example, the operation feeling of the mouse device 1 may be adjusted by using elastic members 40 with different elastic coefficients. Moreover, the pressing stroke of the button 20 may be adjusted by using connecting rod assembly 30 with different heights and/or angles. Therefore, user requirements for different operation feelings can be satisfied.

Figure 8:
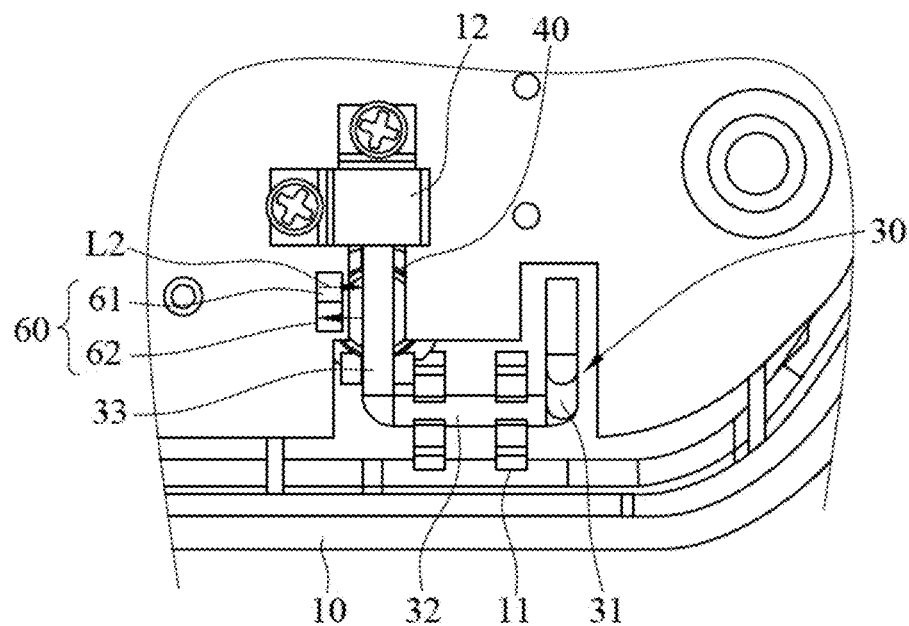
FIG. 8 illustrates another schematic view showing the optical sensing of the button of the mouse device at the initial position, according to an exemplary embodiment of the instant disclosure.
Figure 9:
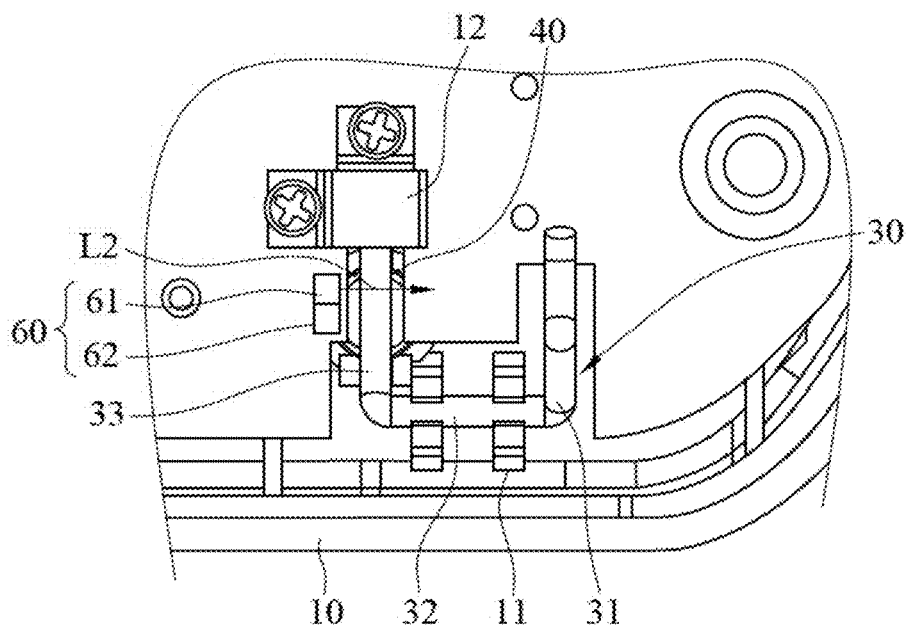
FIG. 9 illustrates another schematic view showing the optical sensing of the button of the mouse device at the pressed position, according to an exemplary embodiment of the instant disclosure.

Moreover, please refer to FIGS. 8 and 9. FIG. 8 illustrates another schematic view showing the optical sensing of the button 20 of the mouse device 1 at the initial position, according to an exemplary embodiment of the instant disclosure. FIG. 9 illustrates another schematic view showing the optical sensing of the button 20 of the mouse device 1 at the pressed position, according to an exemplary embodiment of the instant disclosure. At least one difference between the embodiment shown in FIGS. 8 and 9 and the embodiment shown in FIGS. 5 and 7 is that the configuration for optical sensing. In this embodiment, the optical emitter 61 and the optical receiver 62 of the optical switch 60 are at the same side of the second connecting rod 33, and the second connecting rod 33 is at a light emitting direction of the optical emitter 61, so that the second connecting rod 33 blocks the light emitted by the optical emitter 61. Therefore, when the button 20 is at the initial position (as the position shown in FIG. 4), the light L2 emitted by the optical emitter 61 is reflected to the optical receiver 62 through the second connecting rod 33 (as shown in FIG. 8). Accordingly, the optical switch 60 is not triggered due to that the optical receiver 62 receives the light L2, such that the signal for controlling the mouse cursor is not generated.

As shown in FIG. 9, when the button 20 is pressed to move relative to the casing 10, from the initial position (as the position indicated in FIG. 4), in a direction toward the connecting rod assembly 30 to a pressed position (as the position indicated in FIG. 6), the pressing block 21 can press the first connecting rod 31 and drive the first connecting rod 31 to rotate the rotation shaft 32 relative to the shaft base 11, such that the second connecting rod 33 swings relative to the optical switch 60 along with the rotation of the rotation shaft 32 and the second connecting rod 33 is not at the light emitting direction of the optical emitter 61. Therefore, the second connecting rod 33 does not block the light emitted by the optical emitter 61, such that the light L2 advances forwardly and does not incident into the optical receiver 62. Accordingly, the optical switch 60 is triggered due to that the optical receiver 62 does not receive the light L2, such that the signal for controlling the mouse cursor is generated.

In some embodiments, when the button 20 is at the initial position, the second connecting rod 33 may be not located at the light emitting direction of the optical emitter 61 and does not block the light emitted by the optical emitter 61. Accordingly, the optical switch 60 is not triggered due to that the optical receiver 62 does not receive the light L2, such that the signal for controlling the mouse cursor is not generated. When the button 20 is at the pressed position, the second connecting rod 33 is located at the light emitting direction of the optical emitter 61 and blocks the light emitted by the optical emitter 61. Accordingly, the optical switch 60 is triggered due to that the optical receiver 62 receives the light L2, such that the signal for controlling the mouse cursor is generated.

In some embodiments, the optical switch 60 may be disposed adjacent to the first connecting rod 31 of the connecting rod assembly 30. When the button 20 is at the initial position or the pressed position, the first connecting rod 31 may be configured to be or not to be located at the light emitting direction of the optical emitter 61. Therefore, the generation of the signal for controlling the mouse cursor is determined by whether optical receiver 62 receives the light or not.

Figure 10:
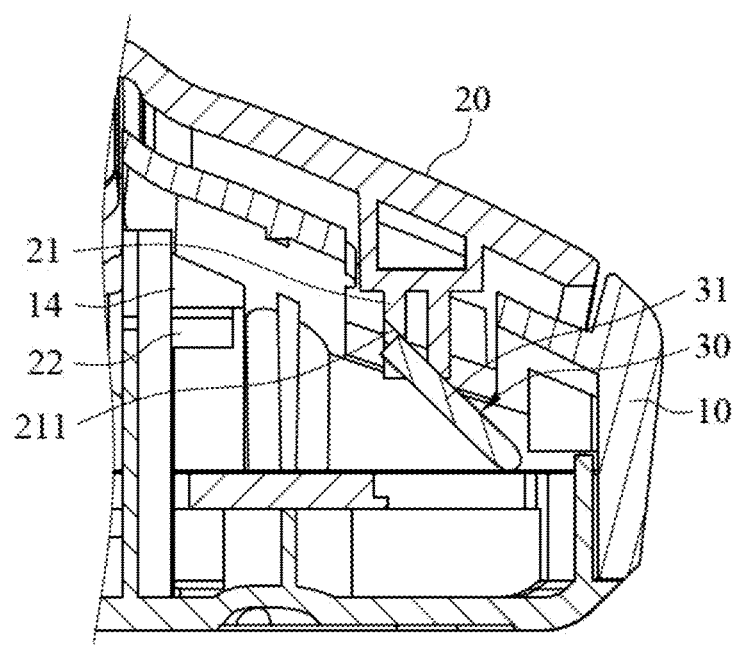
FIG. 10 illustrates another cross-sectional view of the mouse device according to the first embodiment of the instant disclosure.

FIG. 10 illustrates another cross-sectional view of the mouse device 1 of the first embodiment of the instant disclosure. In some embodiments, as shown FIGS. 2 and 10, the bottom of the pressing block 21 of the button 20 further has at least one receiving groove 211, and the first connecting rod 31 of the connecting rod assembly 30 is further received in the receiving groove 211. Therefore, the connecting rod assembly 30 can be limited by the receiving groove 211, thus improving the stability and the reliability of the connecting rod assembly 30 during the operation.

In some embodiments, as shown in FIGS. 3 and 4, a stopping member 12 is further disposed in the casing 10. Specifically, in one or some embodiments, the stopping member 12 may be a stopping plate or a stopping block assembled with and fixed in the casing 10. Alternatively, the stopping member 12 may be a protruding rib or a protruding block extending from the inner surface of the casing 10. When the button 20 is at the initial position, the second connecting rod 33 abuts against the stopping member 12, such that the second connecting rod 33 can be limited and not to be deflected from a predetermined position (for example, the second connecting rod 33 may be disposed between the optical emitter 51 and the optical receiver 52). In this embodiment, the stopping member 12 is a U-shape plate and is fixed in the casing 10 (in this embodiment, the stopping member 12 is lock-fixed in the casing 10). Specifically, in this embodiment, the stopping member 12 has a stopping plate 122 and two side plates 123 respectively connected to two sides of the stopping plate 122. An end portion of the second connecting rod 33 away from the rotation shaft 32 is in a space enclosed by the stopping plate 122 and the two side plates 123, and the stopping plate 122 is between the second connecting rod 33 and the button 20. Therefore, when the button 20 is at the initial position, the second connecting rod 33 abuts against the stopping plate 122 of the stopping member 12.

In some embodiments, the stopping member 12 may be a metal member (e.g., a metal plate or a metal block), and the second connecting rod 33 of the connecting rod assembly 30 may be a metal rod. Therefore, when the button 20 is moved back to the initial position from the pressed position to allow the second connecting rod 33 to abut against the stopping member 12, the contact between the second connecting rod 33 and the stopping member 12 generates sounds for mimicking sounds generated by a physical switch during operation of the physical switch. Moreover, the user can recognize that the button 20 is moved back to the initial position through the sounds.

In some embodiments, as shown in FIGS. 3 and 4, the stopping member 12 further comprises a magnetic member 121. When the button 20 is at the initial position, the second connecting rod 33 further abuts against the magnetic member 121. For example, in this embodiment, the magnetic member 121 is positioned between the stopping plate 122 and the two side plates 123 of the stopping member 12. Therefore, when the button 20 is at the initial position, the end portion of the second connecting rod 33 abuts against and magnetically adheres on the magnetic member 121. Accordingly, when the button 20 is pressed to allow the second connecting rod 33 to detach from the magnetic member 121, the user can feel that the second connecting rod 33 is detached off the magnetic member 121 through the magnetic force. Thus, a better operation feeling of the mouse device 1 can be provided. In some embodiments, the second connecting rod 33 of the connecting rod assembly 30 may be made of non-metal materials, and the end portion of the second connecting rod 33 away from the rotation shaft 32 comprises a metal member. Hence, the end portion of the second connecting rod 33 can abut against and magnetically adhere on the magnetic member 121 through the metal member at the end portion of the second connecting rod 33.

In some embodiments, as shown in FIGS. 3 and 6, a stopping portion 13 may be further disposed in the casing 10. Specifically, in one or some embodiments, the stopping portion 13 may be a stopping plate or a stopping block assembled with and fixed in the casing 10. Alternatively, the stopping portion 13 may be a protruding rib or a protruding block extending from the inner surface of the casing 10. When the button 20 is at the pressed position, the second connecting rod 33 abuts against the stopping portion 13, such that the movement of the button 20 can be controlled upon the button is pressed, and the user can recognize that the button 20 is already pressed to the pressed position. In this embodiment, the stopping portion 13 is a protruding rib and corresponds to the end portion of the second connecting rod 33. Moreover, the stopping portion 13 and the elastic member 40 are at the same side of the second connecting rod 33. Therefore, when the button 20 is at the pressed position, the second connecting rod 33 abuts against the stopping portion 13 and the elastic member 40 at the same time to store the elastic force in the elastic member 40.

In some embodiments, as shown in FIGS. 2, 4, and 6, the button 20 further has a first limiting member 22, and the first limiting member 22 extends into the casing 10. A second limiting member 14 is disposed in the casing 10. The first limiting member 22 and the second limiting member 14 may be plates or blocks. When the button 20 is at the initial position or the pressed position, the first limiting member 22 and the second limiting member 14 abut against and limit with each other, thereby controlling the movement of the button 20 upon the button 20 is pressed. In this embodiment, the casing 10 comprises a hole 102, the first limiting member 22 is a reversed hook plate member extending from an inner surface of the button 20, and the first limiting member 22 passes through the hole 102 and extends into the casing 10. In this embodiment, the second limiting member 14 is a protruding block inside the casing 10. As shown in FIG. 4, when the button 20 is at the initial position, the first limiting member 22 is buckled with the second limiting member 14 to limit the button 20. As shown in FIG. 6, when the button 20 is moved from the initial position to the pressed position, the first limiting member 22 is detached from the second limiting member 14.

Further, as shown in FIG. 10, in this embodiment, the first connecting rod 31 of the connecting rod assembly 30 is a straight rod without bending portions, but embodiments are not limited thereto. In some embodiments, the first connecting rod 31 may be a bent rod, such that the bent rod contacts the pressing block 21 of the button 20 in a different manner. Please refer to FIG. 11, which illustrates a cross-sectional view of a mouse device according to a second embodiment of the instant disclosure. The difference between this embodiment and the embodiment shown in FIG. 4 is, in this embodiment, the first connecting rod 31A is a bent rod and comprises an abutting portion 311A, a bent portion 312A, and a connection portion 313A. The abutting portion 311A abuts against the pressing block 21, the connection portion 313A is connected to the rotation shaft 32, and the bent portion 312A is between the abutting portion 311A and the connection portion 313A. Specifically, in one embodiment, the connection portion 313A extends toward the bottom portion of the pressing block 21 of the button 20. The abutting portion 311A is in parallel with the second connecting rod 33 through the bent portion 312A.

Figure 11:
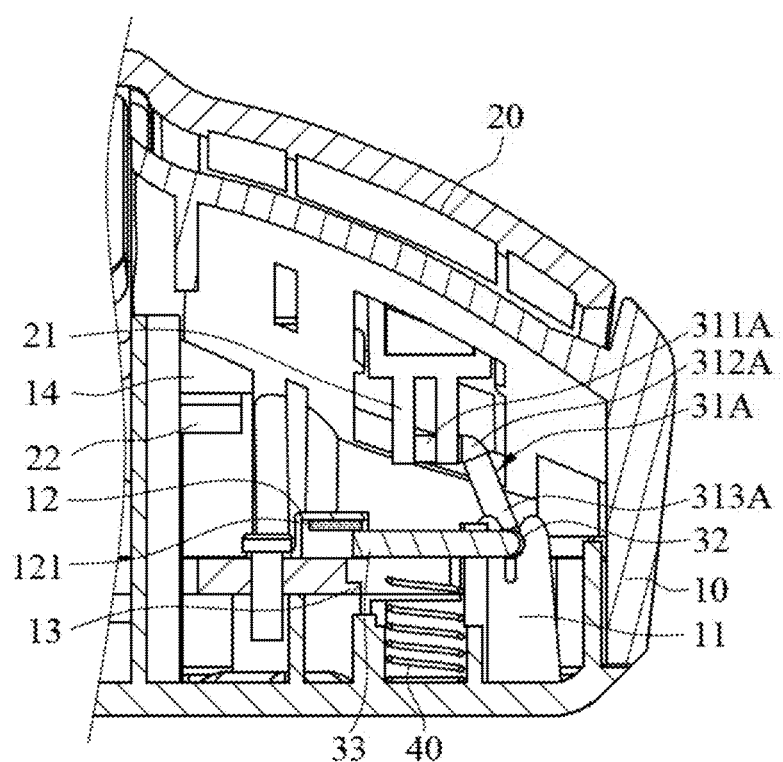
FIG. 11 illustrates a cross-sectional view of a mouse device according to a second embodiment of the instant disclosure.
Figure 12:
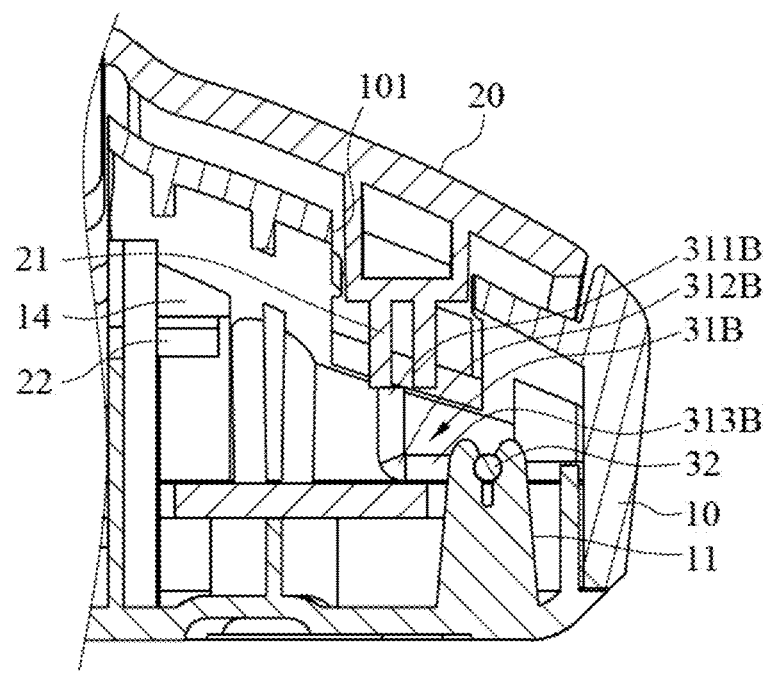
FIG. 12 illustrates a cross-sectional view of a mouse device according to a third embodiment of the instant disclosure.

Alternatively, please refer to FIG. 12, which illustrates a cross-sectional view of a mouse device according to a third embodiment of the instant disclosure. The difference between this embodiment and the embodiment shown in FIG. 11 is, in this embodiment, the connection portion 313B of the first connecting rod 31B and the rotation shaft 32 are at the same plane, the abutting portion 311B is perpendicular to the connection portion 313B through the bent portion 312B, and an end portion of the abutting portion 311B abuts against the bottom portion of the pressing block 21 of the button 20 in a point-contact manner.

As above, according to the mouse device of one or some embodiments of the instant disclosure, physical switches (such as microswitches) may not be necessary. When the button is pressed, the button drives the connecting rod assembly to rotate and to trigger the optical switch, thus not only allowing the optical switch to replace the physical switch but also preventing the idle stroke issues. Hence, the button of the mouse device according to one or some embodiments of the instant disclosure can provide a proper operation feeling and sensitivity during operation. Moreover, during the operation of the mouse device, the optical switch is not worn, thus greatly increasing the service life of the mouse device. Furthermore, by using different elastic members and/or by using connecting rod assemblies with different configurations, the operation feeling and the stroke of the button of the mouse device according to one or some embodiments of the instant disclosure can be adjusted. Therefore, user requirements for different operation feelings can be satisfied.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A mouse device comprising:
   a casing, wherein a shaft base is disposed in the casing;
   a button disposed on the casing, wherein the button has a pressing block, and the pressing block extends into the casing;
   a connecting rod assembly disposed in the casing and rotatably disposed on the shaft base;
   an elastic member disposed in the casing, wherein the elastic member elastically abuts against the connecting rod assembly, so that the connecting rod assembly abuts against the pressing block of the button to allow the button to be at an initial position; and
   an optical switch disposed in the casing and adjacent to the connecting rod assembly;

wherein the button is capable of being moved from the initial position to a pressed position relative to the casing so as to drive the connecting rod assembly to rotate, so that the connecting rod assembly is moved relative to the optical switch to trigger the optical switch.

2. The mouse device according to claim 1, wherein the optical switch comprises an optical emitter and an optical receiver, and the optical emitter and the optical receiver are respectively disposed at two opposite sides of the connecting rod assembly.

3. The mouse device according to claim 2, wherein when the button is at the initial position, the connecting rod assembly is between the optical emitter and the optical receiver, and wherein when the button is at the pressed position, the connecting rod assembly is not between the optical emitter and the optical receiver, so that a light emitted by the optical emitter incidents into the optical receiver to trigger the optical switch.

4. The mouse device according to claim 1, wherein the optical switch comprises an optical emitter and an optical receiver, and the optical emitter and the optical receiver are disposed at a same side of the connecting rod assembly.

5. The mouse device according to claim 4, wherein when the button is at the initial position, the connecting rod assembly is at a light emitting direction of the optical emitter, so that a light emitted by the optical emitter is reflected to the optical receiver through the connecting rod assembly, and wherein when the button is at the pressed position, the connecting rod assembly is not at the light emitting direction of the optical emitter, so that the light emitted by the optical remitter does not incident into the optical receiver and the light triggers the optical switch.

6. The mouse device according to claim 1, wherein a stopping member is further disposed in the casing, and when the button is at the initial position, the connecting rod assembly abuts against the stopping member.

7. The mouse device according to claim 6, wherein the connecting rod assembly is a metal rod, and the stopping member is a metal member.

8. The mouse device according to claim 6, wherein the stopping member further comprises a magnetic member, and the connecting rod assembly abuts against and magnetically adheres on the magnetic member.

9. The mouse device according to claim 1, wherein a stopping portion is further disposed in the casing, and when the button is at the pressed position, the connecting rod assembly abuts against the stopping portion.

10. The mouse device according to claim 1, wherein the button further has a first limiting member extending into the casing, wherein a second limiting member is disposed in the casing, and wherein when the button is at the initial position or the pressed position, the first limiting member and the second limiting member abut against and limit to each other.

11. The mouse device according to claim 1, wherein the connecting rod assembly comprises a first connecting rod, a rotation shaft, and a second connecting rod, wherein the first connecting rod and the second connecting rod respectively extend from the rotation shaft, and the rotation shaft is rotatably disposed on the shaft base, wherein the elastic member elastically abuts against the second connecting rod, so that the first connecting rod abuts against the pressing block of the button, and wherein when the button is moved from the initial position to the pressed position, the first connecting rod or the second connecting rod triggers the optical switch.

12. The mouse device according to claim 11, wherein the first connecting rod and the second connecting rod integrally extend and bend from two opposite ends of the rotation shaft, respectively.

13. The mouse device according to claim 11, wherein a predetermined angle is between the first connecting rod and the second connecting rod.

14. The mouse device according to claim 11, wherein the pressing block has a receiving groove, and the first connecting rod is received in the receiving groove.

15. The mouse device according to claim 11, wherein the first connecting rod comprises an abutting portion, a bent portion, and a connection portion, the abutting portion abuts against the pressing block, the connection portion is connected to the rotation shaft, and the bent portion is between the abutting portion and the connection portion.

* * * * *